US012572613B2

(12) United States Patent
Rayit et al.

(10) Patent No.: US 12,572,613 B2
(45) Date of Patent: Mar. 10, 2026

(54) DUAL MODAL INTERNET SEARCH SYSTEM

(71) Applicant: Microsoft Technology Licensing, LLC, Redmond, WA (US)

(72) Inventors: Baljinder Pal Rayit, Redmond, WA (US); Bradley Moore Abrams, Redmond, WA (US); Rahul Lal, Redmond, WA (US); Jordi Ribas, Redmond, WA (US); Saurabh Tiwary, Redmond, WA (US); Elbio Renato Torres Abib, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/335,986

(22) Filed: Jun. 15, 2023

(65) Prior Publication Data

US 2024/0256623 A1     Aug. 1, 2024

Related U.S. Application Data

(60) Provisional application No. 63/442,452, filed on Jan. 31, 2023.

(51) Int. Cl.
*G06F 16/9538*     (2019.01)
*G06F 16/332*     (2025.01)
*G06F 16/3329*     (2025.01)

(52) U.S. Cl.
CPC ...... *G06F 16/9538* (2019.01); *G06F 16/3329* (2019.01)

(58) Field of Classification Search
CPC ......................... G06F 16/9538; G06F 16/3329
(Continued)

(56) References Cited

U.S. PATENT DOCUMENTS 10,387,528 B2 * 8/2019 Moussa ............. G06F 16/90332
10,853,430 B1 * 12/2020 Gau ....................... G06F 16/958
(Continued)

FOREIGN PATENT DOCUMENTS

CN     107092681 A  *  8/2017
CN     103493046 B  *  2/2018  ........... G06F 16/904
(Continued)

OTHER PUBLICATIONS

International Search Report and Written Opinion received for PCT Application No. PCT/US24/10965, May 8, 2024, 10 pages.
(Continued)

*Primary Examiner* — Phuong Thao Cao
(74) *Attorney, Agent, or Firm* — CALFEE, HALTER & GRISWOLD LLP

(57) ABSTRACT

A computing system is disclosed that includes a processor and memory. The memory stores instructions that, when executed by the processor, cause the processor to perform several acts. The acts include generating a prompt that is to be input to a generative language model. The prompt includes conversational input set forth by a user. The acts further comprise providing the prompt as input to the generative language model, and receiving conversational output from the generative language model, where the generative language model generated the conversational output based upon the prompt. Additionally, the acts comprise receiving an indication that the user has performed an interface mode change action and updating a search engine results page (SERP) to provide information related to the conversational output generated by the generative language model. The acts further comprise presenting the updated SERP to the user on a client computing device.

20 Claims, 9 Drawing Sheets

(58) Field of Classification Search
USPC .......................................................... 707/706
See application file for complete search history.

(56) References Cited

U.S. PATENT DOCUMENTS

| | | | | | |
|---|---|---|---|---|---|
| 10,963,525 | B2 * | 3/2021 | Nishant | .................. | G06N 3/006 |
| 10,984,034 | B1 * | 4/2021 | Sandland | .............. | G10L 15/183 |
| 2009/0281966 | A1 * | 11/2009 | Biggs | ...................... | H04L 51/02 |
| | | | | | 706/11 |
| 2013/0132378 | A1 * | 5/2013 | Gilad-Bachrach | ...... | G06F 16/00 |
| | | | | | 707/E17.084 |
| 2016/0330150 | A1 * | 11/2016 | Joe | ........................ | G06F 3/0486 |
| 2018/0025085 | A1 * | 1/2018 | Sarangi | ................... | H04L 67/02 |
| | | | | | 707/722 |
| 2018/0173714 | A1 * | 6/2018 | Moussa | ................. | G06F 16/248 |
| 2018/0225381 | A1 * | 8/2018 | Loganathan | .......... | G06F 16/951 |
| 2018/0332167 | A1 * | 11/2018 | Lu | ........................ | G06F 16/9535 |
| 2019/0012390 | A1 * | 1/2019 | Nishant | .............. | G06F 16/9535 |
| 2019/0056715 | A1 * | 2/2019 | Subramaniyan | ......... | G06N 7/01 |
| 2021/0191965 | A1 * | 6/2021 | Sandland | ........... | G10L 15/1822 |
| 2022/0374329 | A1 * | 11/2022 | Savir | ................... | G06F 11/3457 |
| 2022/0374446 | A1 * | 11/2022 | Savir | ................... | G06F 16/9024 |
| 2023/0080930 | A1 * | 3/2023 | Seo | ........................ | G06N 3/096 |
| | | | | | 704/9 |
| 2023/0135179 | A1 * | 5/2023 | Mielke | ................... | G06N 5/022 |
| | | | | | 704/232 |
| 2023/0370403 | A1 * | 11/2023 | Kim | ....................... | G06F 3/0482 |
| 2023/0376635 | A1 * | 11/2023 | Kim | ....................... | G06F 3/0481 |
| 2024/0119095 | A1 * | 4/2024 | Sacheti | ................. | G06F 16/953 |
| 2024/0354826 | A1 * | 10/2024 | Aswani | ................... | G10L 15/22 |

FOREIGN PATENT DOCUMENTS

| | | | | | | |
|---|---|---|---|---|---|---|
| CN | | 110914819 | A | * | 3/2020 | ......... G06F 16/3322 |
| EP | | 3607470 | B1 | * | 2/2022 | .......... G06F 16/248 |
| KR | | 20210062486 | A | * | 5/2021 | .......... G06F 16/338 |
| WO | WO-2018208461 | A1 | * | 11/2018 | ......... G06F 16/3322 |
| WO | WO-2024264056 | A1 | * | 12/2024 | |

OTHER PUBLICATIONS

International Preliminary Report on Patentability received for PCT Application No. PCT/US2024/010965, mailed on Aug. 14, 2025, 07 pages.

* cited by examiner

DUAL MODAL INTERNET SEARCH SYSTEM

RELATED APPLICATION

This application claims priority to United States Provisional Patent Application No. 63/442,452, filed on Jan. 31, 2023, and entitled "DUAL MODE INTERNET SEARCH SYSTEM", the entirety of which is incorporated herein by reference.

BACKGROUND

A conventional computer-implemented search engine is configured to receive a search query and infer an information retrieval intent of a user who issued the query (for example, ascertain whether the user wants to navigate to a specific page, whether the user intends to purchase an item or service, whether the user is looking for a fact, whether the user is searching for an image or video, etc.). The search engine identifies results based upon the inferred information retrieval intent and returns a search engine results page (SERP) to a computing device employed by the user. The SERP can include links to webpages, snippets of text extracted from the webpages, images, videos, knowledge cards (graphical items that include information about an entity such as a person, place, company, etc.), instant answers (a graphical item depicts an answer to a question set forth in the query), widgets (such as graphical calculators that can be interacted with by the user), supplemental content (e.g., advertisements that are related to the query), and so forth.

While search engines are frequently updated with features that are designed to improve user experience (and to provide increasingly relevant results to users), search engines are not well-equipped to provide certain types of information. For example, search engines are not configured to provide output that requires reasoning over content of a webpage or output that is based upon several different information sources. For instance, upon receipt of a query "how many home runs did Babe Ruth hit before he turned 30" from a user, a conventional search engine returns a knowledge card about Babe Ruth (which may depict an image of Babe Ruth, a birthdate, etc.), suggested alternate queries (such as "how many hits did Babe Ruth have in his career?"), links to webpages that include statistics, amongst other information. To obtain the answer to the question, the user must access a webpage that includes statistics and compute the answer themselves.

In another example, upon receipt of a query "provide me with a list of famous people born in Seattle and Chicago", a conventional search engine returns knowledge cards about the cities Chicago and Seattle, a link to a first webpage that includes a list of people from Chicago, and a link to a second webpage that includes a list of people from Seattle. The search engine, however, is unable to reason over content of the two webpages to produce a list that includes identities of people from both Chicago and Seattle.

Relatively recently, generative language models (GLMs) (also referred to as large language models (LLMs)) have been developed. An example of a GLM is the Generative Pre-trained Transformer 3 (GPT-3). Another example of a GLM is the BigScience Language Open-science Open-access Multilingual (BLOOM) model, which is also a transformer-based model. Briefly, a GLM is configured to generate an output (such as text in human language, source code, music, video, and the like) based upon a prompt set forth by a user and in near real-time (e.g., within a few seconds of receiving the prompt). The GLM generates content based upon training data over which the GLM has been trained. Accordingly, in response to receiving the prompt "how many home runs did Babe Ruth hit before he turned 30", the GLM can output "Before he turned 30, Babe Ruth hit 94 home runs." In another example, in response to receiving the prompt "provide me with a list of famous people born in Seattle and Chicago", the GLM can output two separate lists of people (one for Seattle and one for Chicago), where the list of people born in Chicago includes Barrack Obama. In both these examples, however, the GLM outputs information that is incorrect—for instance, Babe Ruth hit more than 94 home runs before he turned 30, and Barrack Obama was born in Hawaii (and not Chicago). Accordingly, both conventional search engines and GLMs are deficient with respect to identifying and/or generating appropriate information in response to certain types of user input.

SUMMARY

The following is a brief summary of subject matter that is described in greater detail herein. This summary is not intended to be limiting as to the scope of the claims.

Various technologies are described herein that relate to providing dual mode search functionality by integrating GLM and search engine capabilities. Information provided as input to a GLM that is used by the GLM to generate output is referred to as a prompt. In accordance with technologies described herein, the prompt used by the GLM to generate output can include: 1) user input, such as a query; and 2) information from a webpage being viewed by the user or information retrieved by a search engine. The prompt can also include previous dialog turns, as will be described in greater detail herein.

In an example, a browser of a client computing device loads a search engine webpage, and the browser receives a query set forth by a user of the client computing device. The browser transmits the query to a computing system that executes a search engine, and the search engine identifies search results and generates a search engine results page (SERP) based upon the query. The search results can include webpages related to the query, a knowledge card, an instant answer, entity description, supplemental content, and so forth. The search engine returns the SERP to the browser, whereupon the SERP is displayed on a display of the client computing device when the client computing device is in SERP mode.

The user is provided with functionality that permits the user to switch from SERP mode to GLM chat mode using one or more provided options. For instance, when using a touch screen client computing device such as a smart phone, tablet, or touch screen computer, the user can swipe or scroll between a SERP mode interface and a GLM chat mode interface. In another embodiment the user can tap on a SERP mode graphical icon or a GLM chat mode interface graphical icon to switch between search modes. On a device without a touch screen, the user can manipulate one or more scroll bars to scroll up or down (e.g., such as on a touchpad) between search modes or can use an input device such as a mouse or directional keypad to select a graphical icon corresponding to the desired search mode.

In an example, the search engine receives the query "how many home runs did Babe Ruth hit before he turned 30", and search results identified by the search engine include the birthdate of Babe Ruth and statistics for Babe Ruth by season. The GLM obtains such information as part of the prompt along with the aforementioned query. Because the prompt includes season by season home run totals for Babe Ruth, the GLM reasons over such data and provides output that is based upon the information identified as being relevant to the query by the search engine. Accordingly, the GLM can output "Babe Ruth hit 284 home runs before he turned 30." When the user switches from GLM chat mode to SERP mode (e.g., by swiping, scrolling, selecting a graphical icon, entering a voice command, etc.), the SERP interface is already populated with, e.g., an instant answer, entity description, search results, supplemental content, etc., relating to Babe Ruth. Similarly, when the user enters a query into the SERP mode interface, the search engine provides search result that can include links to webpages, an instant answer, an entity description, supplemental content, etc., in the search interface. When the user scrolls, swipes, etc. to the GLM chat mode interface, information provided by the GLM is displayed as a natural language dialog response.

In another example, when the user has been in GLM chat mode and executes a mode switch action (e.g., swiping or scrolling toward a SERP mode screen or interface, selecting a certain mode graphical icon, entering a voice command indicating a desire to switch to SERP mode, etc.), then the user is presented with an updated SERP that presents links to web pages, an instant answer, entity description, supplemental content, etc., provided by the search engine but based on the most recent query/GLM response in the dialog of the GLM chat mode interface. That is, upon each new user input, query, or prompt to the GLM during GLM chat mode, the GLM generates and submits a new query to the search engine, and the search engine updates the SERP based on the GLM query. In this manner, when the user switches back to the SERP interface from the GLM chat mode interface, the SERP is up to date and current with the most recent instance of the GLM chat dialog.

The technologies described herein exhibit various advantages over conventional search engine and/or GLM technologies. Specifically, through integration with a GLM, a search engine is able to provide information to end users that conventional search engines are unable to provide. In addition, the GLM described herein is provided with information obtained by the search engine to use when generating outputs, thereby reducing the likelihood of the GLM issuing factually incorrect or irrelevant output.

Moreover, the described dual mode search system integrates results from a large generative text model such as, e.g., GPT3, with a traditional search engine. The results are displayed either as part of a traditional SERP or through a conversational search results page or "chat" page. Users can seamlessly transition between the traditional search engine and conversational search results by scrolling or swiping in a predetermined or user selected direction. In another example, transition to and from search engine and conversation mode is facilitated via links in the header and body of the page being viewed. Elements from a traditional search results page such as advertisements and instant answers can be brought into the conversational search results page as well. In this manner, users are allowed to seamlessly switch between a traditional social search results page and a conversational search results page. That is, users can start in traditional search and then transition into conversation mode while maintaining context, and vice versa.

Further, in another example, when altering from SERP mode to chat mode, the query set forth by the user and the top answer returned by the search engine can be carried forward to chat mode, and a GLM response can be provided beneath such information. This provides a seamless flow in chat mode.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 7 shows a flow diagram for providing dual mode search functionality in a computing system, in accordance with one or more aspects described here in.

DETAILED DESCRIPTION

Figure 1:
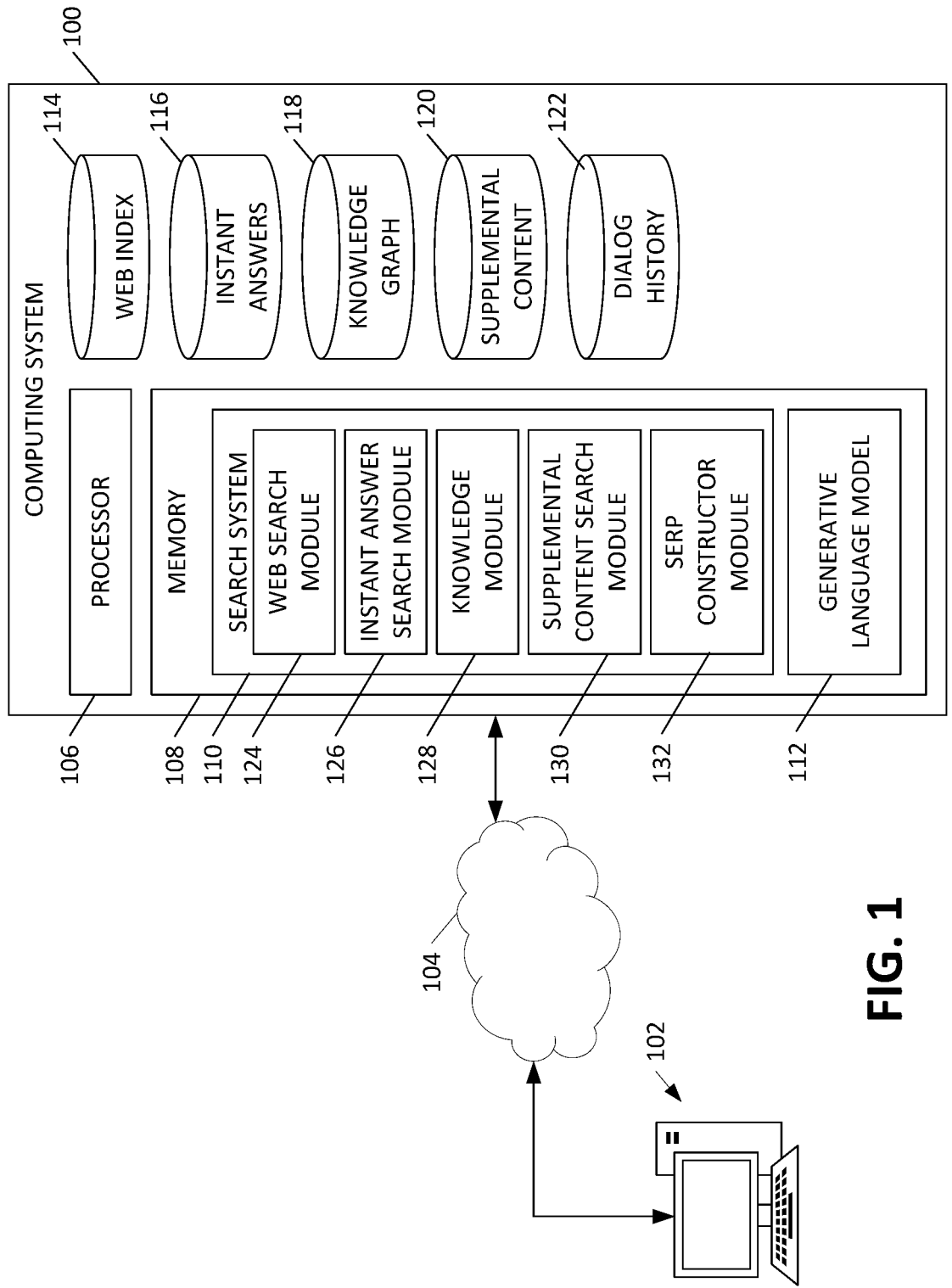
FIG. 1 shows a functional block diagram of a computing system, in accordance with various aspects described herein.

Various technologies pertaining to providing a dual mode search functionality on a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality described as being carried out by certain system components may be performed by multiple components. Similarly, for instance, a component may be configured to perform functionality described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", "engine", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining providing dual mode search functionality using a search engine and a generative language model (GLM), also referred to as a large language model (LLM). The described systems and methods permit rapid and seamless transition between a "SERP" mode of search using the search engine and a GLM chat mode wherein the user is provided with an online chat dialog experience. Moreover, when switching from GLM chat mode to SERP mode, the SERP is automatically updated to display information related to the most recent prompt/response in the GLM dialog.

Referring now to FIG. 1, a functional block diagram of a computing system 100 is illustrated, in accordance with various aspects described herein. While illustrated as a single system, it is to be understood that the computing system 100 can include several different server computing devices, can be distributed across data centers, etc. The computing system 100 is configured to obtain information based upon a query set forth by a user and is further configured to provide the obtained information as a portion of a prompt to a GLM.

A client computing device 102 operated by a user (not shown) is in communication with the computing system 100 by way of a network 104. The client computing device 102 can be any suitable type of client computing device, such as a desktop computer, a laptop computer, a tablet (slate) computing device, a video game system, a virtual reality or augmented reality computing system, a mobile telephone, a smart speaker, or other suitable computing device.

The computing system 100 includes a processor 106 and memory 108, where the memory 108 includes instructions that are executed by the processor 106. More specifically, the memory 108 includes a search engine 110 and a GLM 112, where operations of the search engine 110 and the GLM 112 are described in greater detail below. The computing system 106 also includes data stores 114-122, where the data stores 114-122 store data that is accessed by the search engine 110 and/or the GLM 112. With more particularity, the data stores 114-122 include a web index data store 114, an instant answers data store 116, a knowledge graph data store 118, a supplemental content data store 120, and a dialog history data store 122. The web index data store 114 includes a web index that indexes webpages by keywords included in or associated with the webpages. The instant answers data store 116 includes an index of instant answers that are indexed by queries, query terms, and/or terms that are semantically similar or equivalent to the queries and/or query terms. For example, the instant answer "2.16 meters" can be indexed by the query "height of Shaquille O'Neal" (and queries that are semantically similar or equivalent, such as "how tall is Shaquille O'Neal").

The knowledge graph data store 118 includes a knowledge graph, where a knowledge graph includes data structures about entities (people, places, things, etc.) and their relationships to one another, thereby representing relationships between the entities. The search engine 110 can use the knowledge graph in connection with presenting entity cards on a search engine results page (SERP). The supplemental content data store 120 includes supplemental content that can be returned by the search engine 110 based upon a query.

The dialog history data store 122 includes dialog history, where the dialog history includes dialog information with respect to users and the GLM 112. For instance, the dialog history can include, for a user, identities of conversations undertaken between the user and the GLM 112, input provided to the GLM 112 by the user for multiple dialog turns during the conversation, responses in the conversation generated by the GLM 112 in response to the inputs from the user, queries generated by the GLM during the conversation that are used by the GLM 112 to generate responses, and so forth. In addition, the dialog history can include context obtained by the search engine 110 during conversations; for instance, with respect to a conversation, the dialog history 122 can include content from SERPs generated based upon queries set forth by the user and/or the GLM 112 during the conversation, content from webpages identified by the search engine 110 based upon queries set forth by the user and/or the GLM 112 during the conversation, and so forth. The data stores 114-122 are presented to show a representative sample of types of data that are accessible to the search engine 110 and/or the GLM 112; it is to be understood that there are many other sources of data that are accessible to the search engine 110 and/or the GLM 112, such as data stores that include real-time finance information, data stores that include real-time weather information, data stores that include real-time sports information, data stores that include images, data stores that include videos, data stores that include maps, etc. Such sources of information are available to the search engine 110 and/or the GLM 112.

The search engine 110 includes a web search module 124, an instant answer search module 126, a knowledge module 128, a supplemental content search module 130, and a SERP constructor module 132. The web search module 124 is configured to search the web index data store 114 based upon queries received by users, queries generated by the search engine 110 based upon queries received by users, and/or queries generated by the GLM 112 based upon interactions of users with the GLM 112. Similarly, the instant answer search module 126 is configured to search the instant answers data store 116 based upon queries received by users, queries generated by the search engine 110 based upon queries received by users, and/or queries generated by the GLM 112 based upon interactions of users with the GLM 112. The knowledge module 128 is configured to search the knowledge graph data store 118 based upon queries received by users, queries generated by the search engine 110 based upon queries received by users, and/or queries generated by the GLM 112 based upon interactions of users with the GLM 112. Likewise, the supplemental content search module 130 is configured to search the supplemental content data store 120 based upon queries received by users, queries generated by the search engine 110 based upon queries received by users, and/or queries generated by the GLM 112 based upon interactions of users with the GLM 112.

The SERP constructor module 132 is configured to construct SERPs based upon information identified by searches performed by the modules 124-130; for instance, a SERP can include links to webpages identified by the web search module 124, an instant answer identified by the instant answer search module 126, an entity card (that includes information about an entity) identified by the knowledge module 128, and supplemental content identified by the supplemental content search module 130. Further, a SERP may include a widget, a card that depicts current weather, and the like. The SERP constructor module 132 can also generate structured, semi-structured, and/or unstructured data that is representative of content of the SERP or a portion of the content of the SERP. For instance, the SERP constructor module 132 generates a JSON document that includes information obtained by the search engine 110 based upon one or more searches performed over the data stores 114-120 (or other data stores). In an example, the SERP constructor module 132 generates data that is in a structure/format to be used as a portion of a prompt by the GLM 112.

As discussed above, operation of the search engine 110 is improved based upon the GLM 112, and operation of the GLM 112 is improved based upon the search engine 110. For instance, the search engine 110 is able to provide outputs that the search engine 110 was not previously able to provide (e.g., based upon outputs generated by the GLM 112), and the GLM 112 is improved by using information obtained by the search engine 110 to generate outputs (e.g., information identified by the search engine 110 can be included as a portion of a prompt used by the GLM 112 to generate outputs). Specifically, the GLM 112 generates results based upon information obtained by the search engine 110 that have a higher likelihood of being accurate when compared to results generated by GLMs 112 that are not based upon such information, as the search engine 110 is associated with years of design to curate information sources to ensure accuracy thereof.

Figure 2:
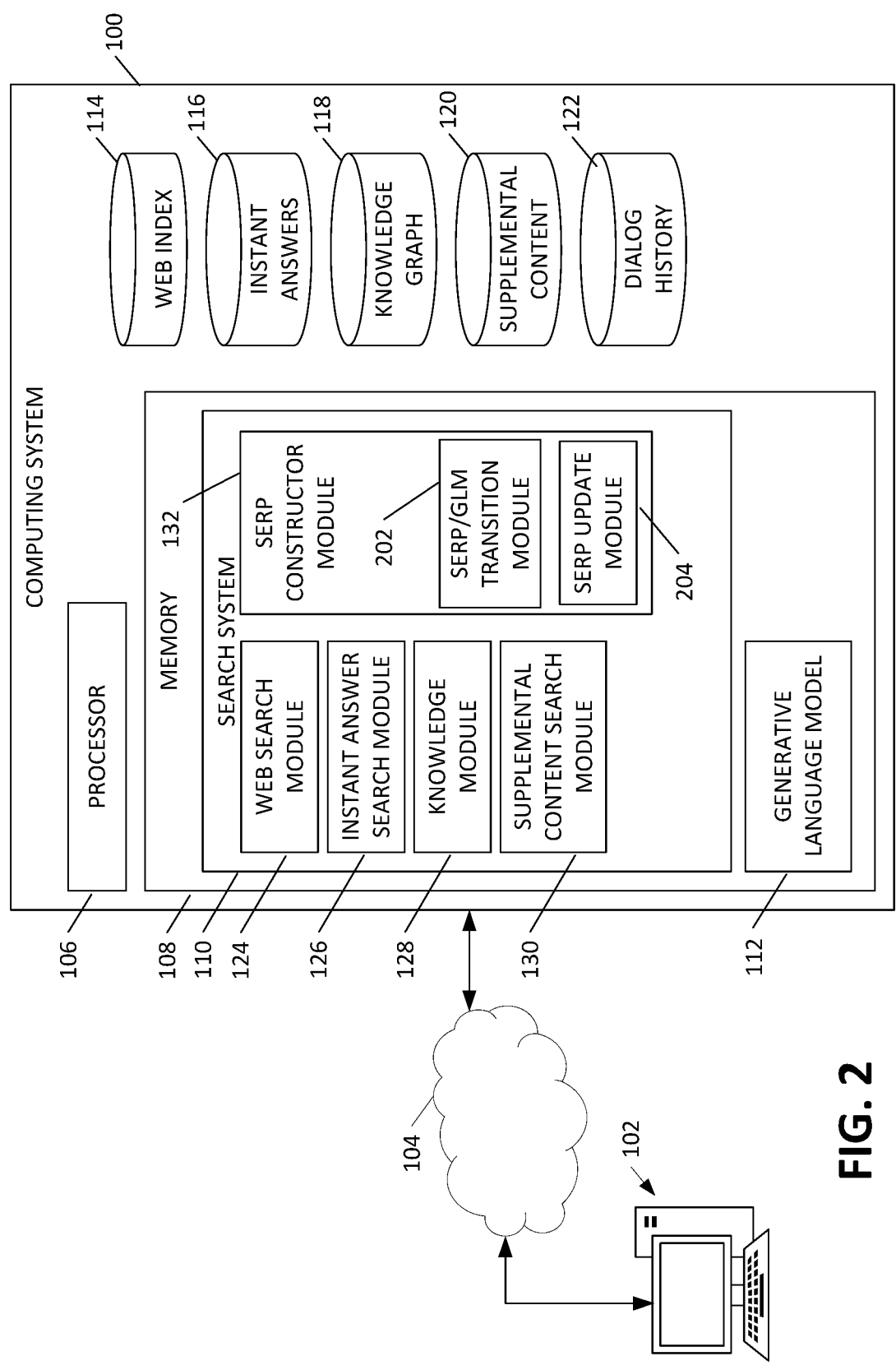
FIG. 2 illustrates the computing system with additional elements for providing seamless transition between search modes.

With continued reference to FIG. 1, FIG. 2 illustrates the computing system 100, which, as described with regard to FIG. 1, includes the processor 106 and memory 108, where the memory 108 includes instructions that are executed by the processor 106. More specifically, the memory 108 includes the search engine 110 and the GLM 112, where operations of the search engine 110 and the GLM 112 are described in greater detail above with regard to FIG. 1. The computing system 106 also includes the data stores 114-122, where the data stores 114-122 store data that is accessed by the search engine 110 and/or the GLM 112 as described above.

The search engine 110 includes the web search module 124, the instant answer search module 126, the knowledge module 128, the supplemental content search module 130, and the SERP constructor module 132.

In addition to the elements set forth with regard to FIG. 1, the SERP constructor module 132 comprises a SERP/GLM transition module 202 and a SERP update module 204. The SERP/GLM transition module 202 receives an indication of a SERP/GLM transition action performed on the client device 102. The SERP/GLM transition action indicates a user desire to switch between a SERP mode of search and a GLM chat mode or vice versa. For example, if the user is in GLM chat mode and then swipes toward SERP mode, selects a SERP mode graphical icon, enters a voice command to switch to SERP mode, or the like, then the client device sends an indication of the user's desire to switch modes to the computing system 100. The SERP/GLM transition module 202 detects the transition action, and the SERP update module updates the SERP provided to the client device to include instant answers, entity descriptions, search results, supplemental content, etc., to include information related to the most recent query/response provided in GLM chat mode (e.g., a traditional query mode that returns search results, instant answers, entity descriptions, and the like). Conversely, if the user indicates a desire to switch from GLM chat mode to SERP mode, then the indication is detected by the SERP/GLM transition module 202 and the generative language model 112 is prioritized over the search system 110 for providing dialog responses to the client device and GLM chat mode.

It will be understood that the various databases described herein with regard to FIGS. 1 and 2 store cached information such as, e.g., cached web pages or other data sources for responding to chat queries and/or providing search results or other information in the SERPs provided to the client device. Cached webpages are periodically updated and/or invalidated in order to maintain up-to-date source data.

Figure 3:
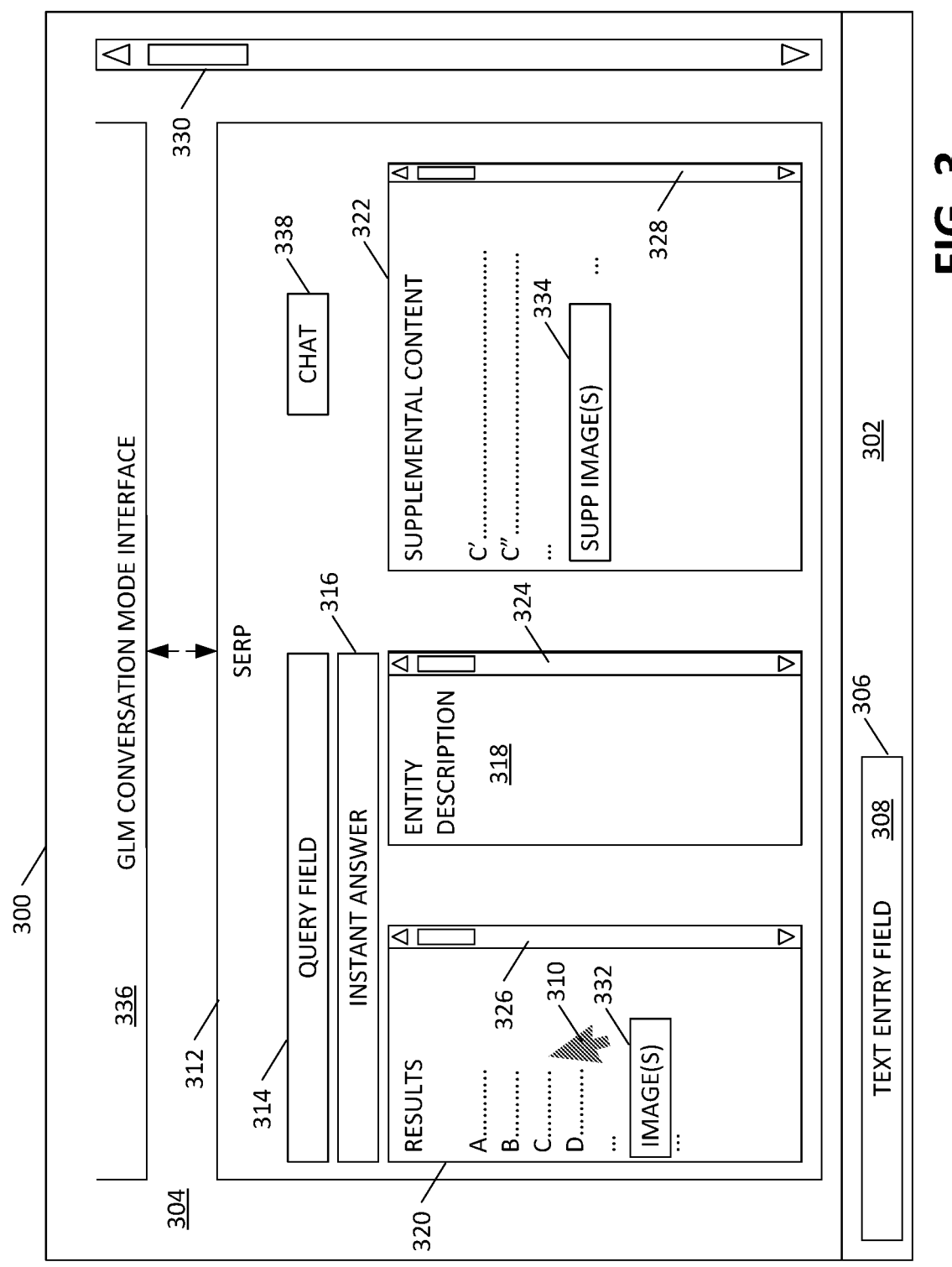
FIG. 3 shows a schematic that depicts a GUI of an operating system installed on a computing device showing a SERP mode interface, in accordance with various aspects described herein.

Referring now to FIG. 3, a schematic that depicts a GUI generated by the computing system 100 is illustrated, where the GUI 312 includes a query field 314 into which a user may type a query for performing a search. The query is submitted to a search engine (not shown) that returns an instant answer 316 (if applicable), an entity description 318 (if applicable), links to webpages 320 identified by the search engine as being related to the query, and supplemental content 322. The instant answer 316 is, for instance, an answer supplied by the search engine in response to the query, without the user having to navigate away from the SERP 312. The instant answer can be an answer that was previously verified and cached in response to the same query.

It will be understood that the illustrated orientation of the query field 314, the instant answer 316, the entity description 318, the search results 320, and the supplemental content 322 relative to each other is presented by way of example only and is not intended to limit the particular arrangement of these elements within the SERP 312. For instance, the query field 314 may be presented below the results 320 and the entity description 318. In another example, the position of the instant answer 316 may be swapped with the position of the entity description 318. In another example, the query field 314, instant answer 316, entity description 318, results 320, and supplemental content 322 may be presented as a vertical stack of fields, in any order.

A slider bar 330 is provided for scrolling up or down on the primary display area 304. For instance, the user can use the slider bar 330 to navigate up or down in the results field through various results (labeled A, B, C, D, . . . ) and/or one or more images 332. Similarly, the user can use the slider bar 328 to navigate up or down through supplemental content results (labeled C', C'', . . . ) and/or one or more supplemental images 334. In one embodiment, the user can hover the pointer 310 over a particular result in the results field 320 and the system will retrieve and present in the supplemental content field 322 additional content related to the result over which the pointer is hovered. In another embodiment, when the user hovers the pointer over a particular result, a pop up window is displayed showing the source of the information and/or supplemental information such as an ad (image or video) presented on the source page. In the example of FIG. 3, the user has hovered the pointer over the link to webpage C, and the system has retrieved supplemental content C' and C'' related to content being hovered over.

When the user decides to switch from SERP mode to chat mode (also referred to as "conversation mode" herein), the user can use the slider bar 330 to navigate upwards to a generative language model (GLM) conversation mode interface 336. Additionally or alternatively, a graphical icon 338 can be provided which, when selected by the user, causes the screen to scroll upward or otherwise switch to the GLM conversation mode interface 336. It will be understood that the direction of the swipe required to switch between SERP and GLM conversation mode is not limited to the upward direction, but rather may be a downward swipe, a rightward swipe, or a leftward swipe, as will be understood by one of ordinary skill in the art.

In another embodiment, wherein the computing device 102 comprises a touch screen, the user can simply swipe upward or downward using a finger, stylus, or other device. In this embodiment slider bar 330 becomes optional. Alternatively, the slider bar 330 may be retained, or may be displayed when the user's finger or stylus is in contact with the screen in one of the field 320, the entity description field 318, the supplemental content field 322, or the main display area 304, respectively. When the user disengages the touch screen, the respective slider bar disappears.

In another embodiment, the client computing device 102 comprises a microphone (not shown) via which the user can initiate a voice command for searching and/or for switching between search modes (SERP and GLM). In one example, when the user initiates voice operation, the search mode defaults to conversation or chat mode. In another example the search mode defaults to SERP mode. In yet another example, the user is permitted to configure the default search mode according to user preference.

Figure 4:
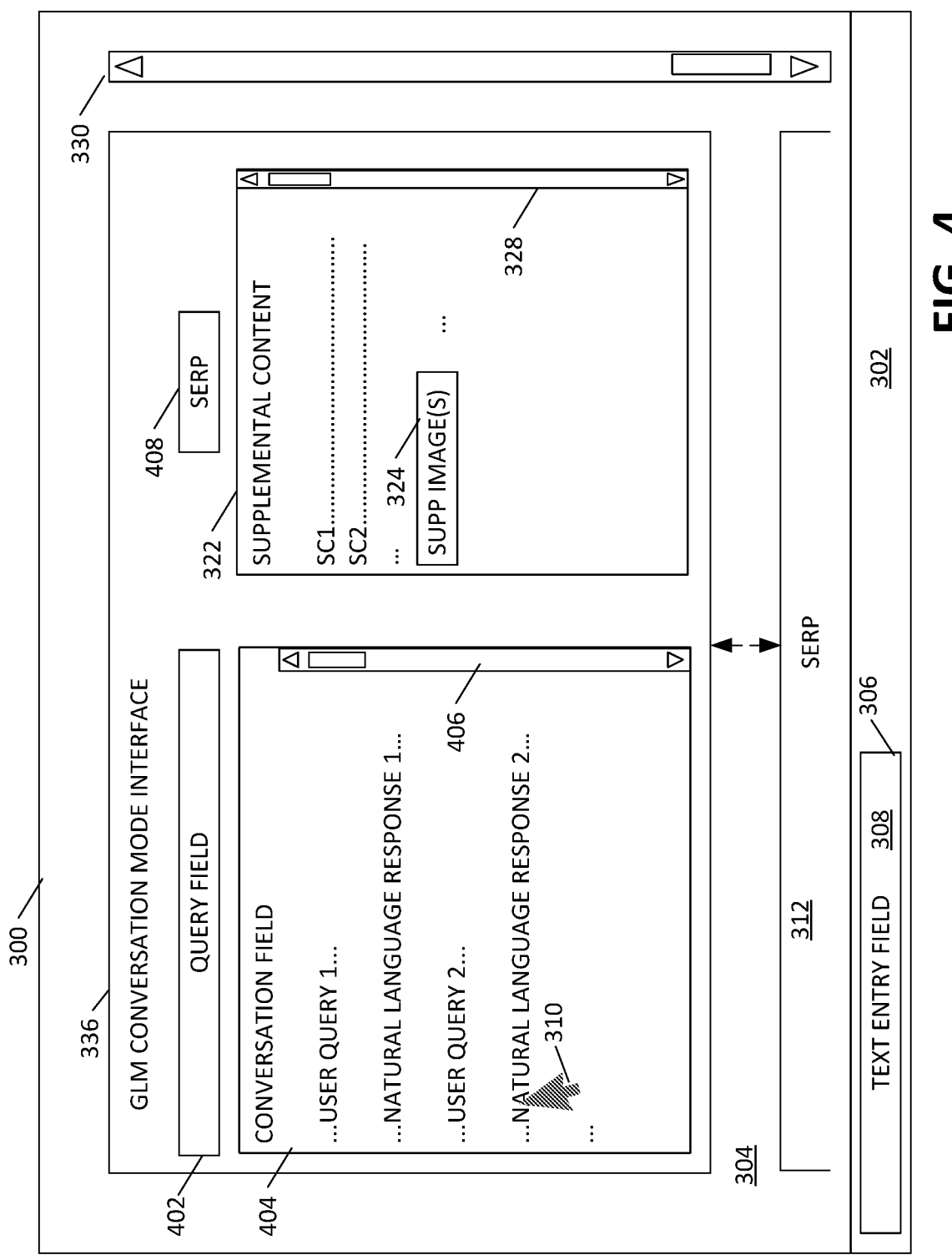
FIG. 4 illustrates a schematic that depicts the GUI of the operating system installed on the computing device showing a GLM chat mode interface.

Referring now to FIG. 4, a schematic that depicts another view of the GUI 300 is illustrated. The GUI 300 depicts the conversation mode interface 336 to which the user has navigated from the SERP interface 312 via the slider bar 330, the chat mode graphical icon 338, via touch screen functionality, via an input device such as a mouse or directional pad on a keyboard, etc. The GLM conversation mode interface 336 comprises an input field 402 that can be selected by via the pointer 310, a finger or stylus in the case of a touch screen, or any other suitable means. The user enters conversational input into the input field 402 for submission to the GLM 112, once submitted, the conversational input appears in a conversation field 404. The conversation field 404 optionally comprises a slider bar 406 via which the user can navigate upward and downward through the chat dialog. The user query is submitted to the GLM 112 (FIG. 1), which returns a natural language response as an answer to the conversational input. The user is permitted then to respond to the natural language response provided by the search engine as though having a conversation with another human. The GLM 112 then provides a second natural language response to the user and the conversation continues. Meanwhile the user can hover the pointer 310 over any of the natural language responses provided by the GLM 112 and the GLM 112 can form and submit queries to return supplemental content 322 for presentation in or adjacent to the GLM conversation mode interface 336 on the GUI 300. The supplemental content 322 typically includes one or more selectable links to articles or webpages related to the natural language response over which the pointer 310 is hovered and may also include one or more supplemental images 334. The slider bar 328 is provided within the supplemental content field 322 and permits the user to scroll through the supplemental content and or images 334 in the supplemental content field.

In one embodiment, the GUI also comprises a selectable SERP graphical icon, which, when selected or otherwise activated by the user, causes the system to revert back to the SERP interface 312. Additionally or alternatively, the user may employ the scroll bar 330 to scroll back to the SERP interface 312. In another embodiment, in which the GUI 300 is displayed on a touch screen device, the user may simply use a finger or stylus to scroll back to the SERP interface 312.

According to another feature, when the user returns to the SERP interface 312, the instant answer 316, entity description 318, query results 320, and supplemental content 322 (see FIG. 3) are populated with information related to the last user query entered during the conversation in the GLM conversation mode interface 336. That is, the SERP is updated to reflect results for the most recent query made in the GLM conversation mode interface 336. In this manner, the user is permitted to switch back and forth between the SERP interface 312 and the GLM conversation mode interface 336 while providing seamlessly and continuously updated search result information regardless of which interface the user is currently using.

In another embodiment, the client computing device 102 comprises a microphone (not shown) via which the user can initiate a voice command for searching and/or for switching between search modes (SERP and GLM). In one example, when the user initiates voice operation, the search mode defaults to conversation or chat mode. In another example the search mode defaults to SERP mode. In yet another example, the user is permitted to configure the default search mode according to user preference.

Figure 5:
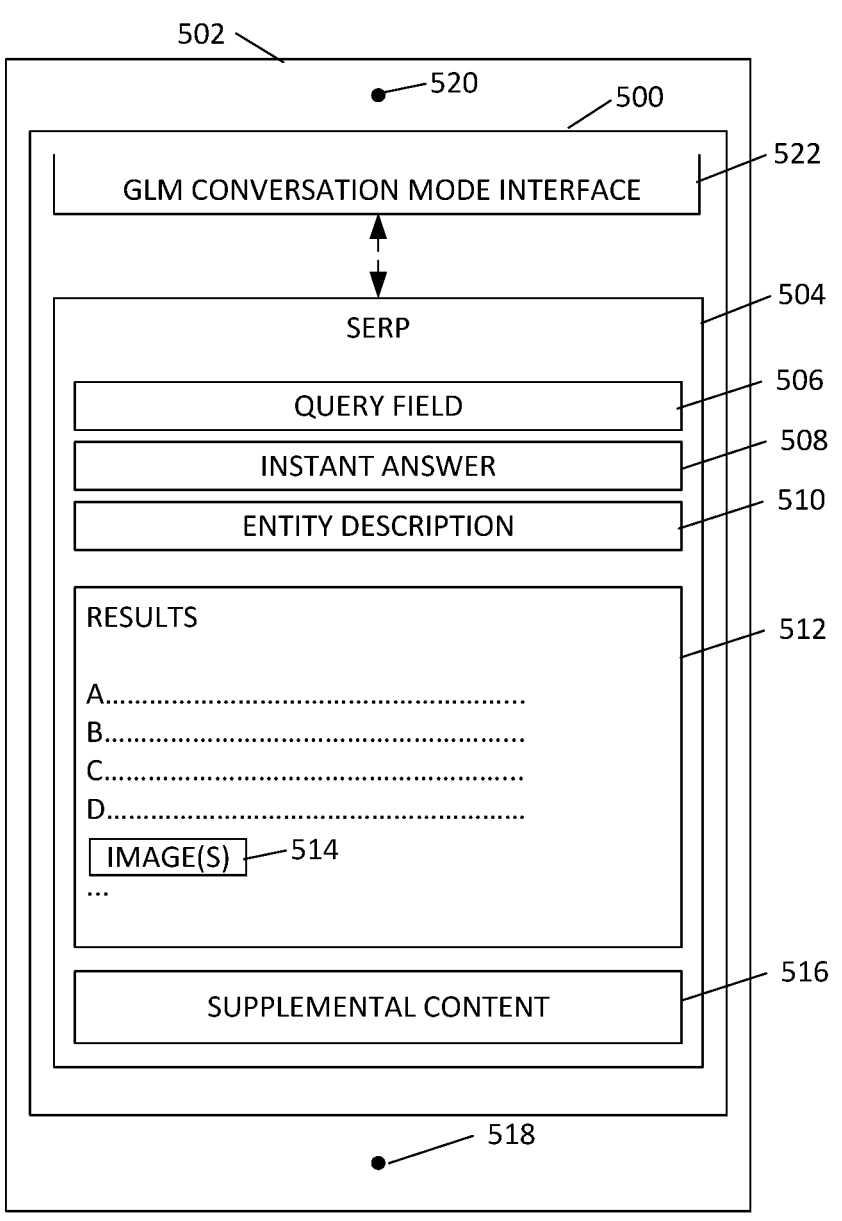
FIG. 5 is an illustration of a GUI on a communication device in the SERP mode, in accordance with one or more aspects described herein.

With reference now to FIG. 5, a GUI 500 is illustrated on a communication device 502, such as a tablet, cell phone, smartphone, etc., in accordance with one or more aspects described herein. The GUI 500 comprises a SERP interface 504 that includes a query field 506, an instant answer field 508 (when applicable), an entity description field 510 (when applicable), and a results field 512. In the results field 512 are displayed one or more links to webpages (labeled A through D) returned in response to a query entered into the query field 506 and optionally one or more images 514. The user clicks on one of the returned results A-D, and the device displays the received information associated with the selected result. Additionally, the system retrieves supplemental content 516 (e.g., additional articles, hyperlinks, images, ads, etc.) related to the selected result, and displays the supplemental content on the SERP interface 504.

It will be understood that the particular order in which the query field 506, instant answer 508, entity description 510, results field 512, and supplemental content field 514 is not limited to that depicted in FIG. 5, but rather these elements may be arranged in any order. Furthermore, the depicted elements in the SERP interface 504 are not limited to a stacked arrangement as shown in FIG. 5, but rather may be arranged side by side, in a grid arrangement, etc.

The communication device 502 further comprises a microphone 518 and one or more speakers 520 via which the user can enter voice commands and receive audio from the communication device. For example, the user may initiate a query by saying the word "query" or "question" to activate the microphone, followed by words or phrases that the user might otherwise enter manually into the query field 506. The results field 512 can be populated with results (e.g., hyperlinks, article titles, images 512, etc.) responsive to the user's voice query. In another embodiment, the results can be read out and presented to the user via the speaker(s) 520 as audio output.

In another embodiment, a voice activation graphical icon (not shown) can be provided in the query field 506 or elsewhere in the SERP interface 504. Upon selection (e.g., tap or long press) of the voice activation graphical icon by the user, the user is prompted to begin speaking and can speak a natural language query into the microphone 518. One or more of the returned instant answer 508, entity description 510, results 512, and/or supplemental content 514 can be presented to the user as audio output via the one or more speakers 520.

When the user desires to switch from the SERP interface 504 to the GLM conversation mode interface 522, the user scrolls upward on the GUI 500, e.g., using a finger or stylus to activate the touch screen. Additionally or alternatively, a chat mode graphical icon (not shown) may be presented on the SERP interface 504 or elsewhere on the GUI 500, where in the graphical icon can be selected or activated by the user to switch to GLM conversation mode. In yet another embodiment, the user may give a voice command such as "chat mode" or some other suitable voice command in order to switch from SERP mode to chat mode.

Figure 6:
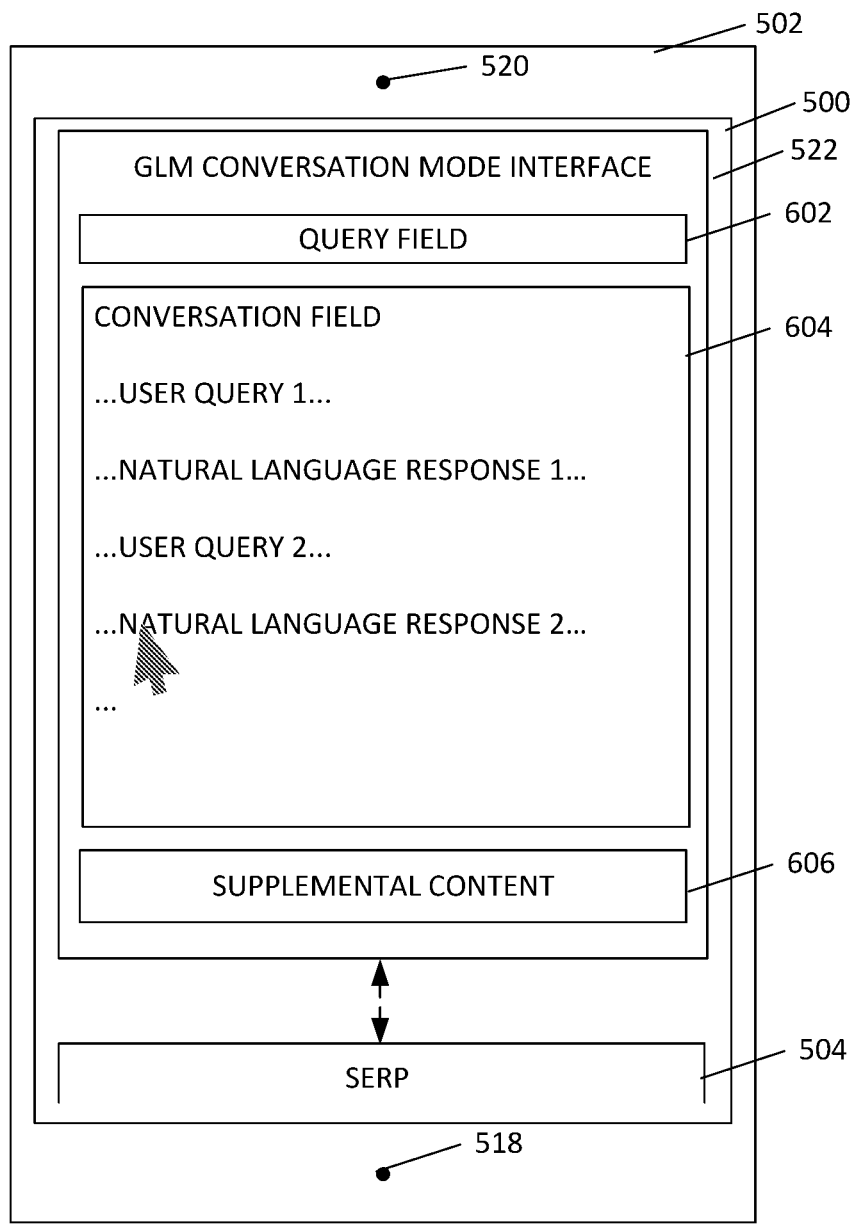
FIG. 6, shows a GUI on a communication device in the GLM conversation mode, in accordance with various embodiments described herein.

With reference now to FIG. 6, shown on the GUI 500 of the communication device 502 is the GLM conversation mode interface 522, in accordance with various embodiments described herein. The GLM conversation mode interface 522 comprises an input field 602 into which a user can type or speak a conversational input. The GLM conversation mode interface 522 also comprises a conversation field 604 that, upon the conversational input being submitted to the GLM 112, shows the user's initial conversational input (input 1) and the system's natural language response to that input (response 1). The user queries and the natural language responses generated by the system are displayed to the user in the conversation field 604 as a dialog. An example of a conversation dialog that can be displayed in the conversation field 604 is provided below.

QUERY 1: In what state is Ann Arbor located?
RESPONSE 1: Ann Arbor is located in the state of Michigan, United States.
QUERY 2: Tell me more.
RESPONSE 2: Ann Arbor is a city in the southeastern region of Michigan, located about 35 miles (56 K m) West of Detroit. It is the county seat of Washtenaw County and is known for being home to the University of Michigan, one of the oldest and most prestigious public universities in the United States.
QUERY 3: What SAT score does the University require?
RESPONSE 3: The University of Michigan requires that students submit SAT scores as part of their application. For the SAT, the middle 50% range for the class of 2025 was 1340 to 1470.

As can be seen the responses generated by the system take into account the context of the conversation. For instance, when the user refers to "the University" in query 3, the system deduces that the user is referring to the University of Michigan based on the context of Response 2. The communication device 502 also comprises the microphone 518 and one or more speakers 520, which permit the user to speak the queries and listen to the responses during the conversation as described above with regard to FIG. 5.

The system is also able to generate supplemental content 606 for display within the GLM conversation mode interface 522 or elsewhere on the GUI 500. The supplemental content 606 is identified retrieved using the context of the conversation and can comprise additional links, images, selectable graphical icons, etc., on which the user can click for additional information. For example, the content may include links to one or more hotels in the Ann Arbor area, restaurants in Ann Arbor, to buy tickets to University of Michigan sporting events, etc. without being limited thereto.

When the user desires to return to the SERP mode interface 504, the user simply scrolls downward on the GUI 500. In another embodiment, the user is permitted to use voice commands to switch between SERP mode and GLM conversation mode. When the user returns to the SERP interface, the instant answer and results fields are populated with information related to SAT score requirements at the University of Michigan, while the entity description field presents information about the University of Michigan itself. The supplemental content field is populated with supplemental content similar to that presented on the GLM conversation mode interface.

There are various other features contemplated with reference to a system that integrates a search engine with a GLM. For example, as indicated previously, the GLM 112 can generate conversational output based upon conversational input. In an example, the GLM 112 can analyze the conversational input and/or conversational output to generate a variety of different outputs. For instance, the GLM 112 can generate query suggestions that are well-suited for submission to the search engine 110, such that the GLM 112 can prompt the user to switch to search engine mode. For instance, based upon the conversational input "What SAT score does the University require", the GLM 112 can generate several queries that are configured to be received by the search engine 110, such as "locations near me where the SAT exam can be taken", "dates of SAT exam", amongst others. The GLM 112 can assign a hyperlink to text in the conversational input and/or text in conversational output, where upon hovering over the hyperlink one or more query suggestions can be presented.

In another example, as noted above, the search engine 110 is configured to output instant answers and/or knowledge cards where applicable. For instance, in response to receiving the query "stock price of company A", the search engine 110 generates an instant answer that identifies the stock price of company A. The GLM 112 can be provided with the query submitted by the user and/or the content of the instant answer and can generate further query suggestions and/or conversational input suggestions based upon the query submitted by the user and/or the content of the instant answer. The query suggestions and/or conversational input suggestions can be presented together with the instant answer to visually indicate that the query suggestions and/or conversational input suggestions correspond to the instant answer. An example query suggestion is "who is the CEO of company A"; an example conversational input suggestion is "describe differences in business between company A and company B". Further, graphical indications can be presented to identify which suggestions are conversational suggestions and which are suggestions for queries to be used by the search engine 110 to identify search results. Upon the conversational input suggestion being selected, such suggestion is used as input by the GLM 112 to generate conversational output, and context can switch to conversational mode (e.g., GUI features pertaining to conversational mode are presented). While the above example pertained to an instant answer, it is to be understood that similar features can be employed in connection with knowledge cards, widgets, and/or supplemental content.

In still yet another example, rather than having two separate and distinct interfaces for conversational mode and search engine mode, the interfaces can be integrated with one another. For instance, the conversational interface can be presented in a sidebar. In yet another example, when input is received, a classifier can identify whether input set forth by a user is conversational in nature and is thus to be provided to the GLM 112 or whether the input is better-suited for provision to a search engine. For instance, "stock price of company A" is typically better-suited as a query that is to be issued to a search engine, while input "explain the different between the businesses of company A and company B" is typically-better suited as conversational input that is to be issued to a GLM 112. In the former case, the query is provided to the search engine 110, and the search engine 110 executes a search; for instance, the search engine 110 provides an instant answer that identifies the current stock price of Company A. In the latter case, the conversational input is provided to the GLM 112, and the GLM 112 generates conversational output based upon such input. In an example, the conversational output is provided in a GUI that integrates conversational mode with search mode, such that the conversational output can be presented proximate to knowledge cards about companies A and B.

In still yet another example, when generating conversational output, the GLM 112 can identify sources for information included in the output and can generate hyperlinks that correspond to those sources and/or queries usable by the search engine 110 to retrieve the sources. For instance, and with reference to the conversational input "explain the different between the businesses of company A and company B", the GLM 112 can generate the output "The business of company A is to make widgets of type 1, which are manufactured mostly at location C. In contrast, the business of company B is to make widgets of type 2, which are mostly manufactured at location D. Company A had more revenue than company B in 2022, yet profit margins for company B are higher than those of company A."

The GLM 112 can identify sources of information used by the GLM 112 to identify types of widgets made by the companies, to identify where the widgets are manufactured, to identify revenue numbers for the companies, and to identify profit margins pertaining to the companies. Upon hovering over text (for example, "revenue"), a query suggestion for retrieving information about company revenues and/or an identity of a webpage that includes revenue information about company A and/or company B can be presented by the GLM 112. Accordingly, the user can ascertain that the information provided by the GLM 112 is accurate and up-to-date.

While examples presented above have referred to general purpose search engines, it is contemplated that technologies described herein are applicable to enterprise search engines. For instance, enterprise search engines are configured to search over documents that are specific to an enterprise, where the documents can include internal webpages, word processing documents, slideshows, and so forth. Similar to what has been reference above, enterprise search can be integrated with a GLM, such that conversational output pertaining to enterprise documents can be generated based upon conversational input and shown in a GUI that pertains to chat and/or in a GUI with chat integrated with conventional search.

Figure 7:
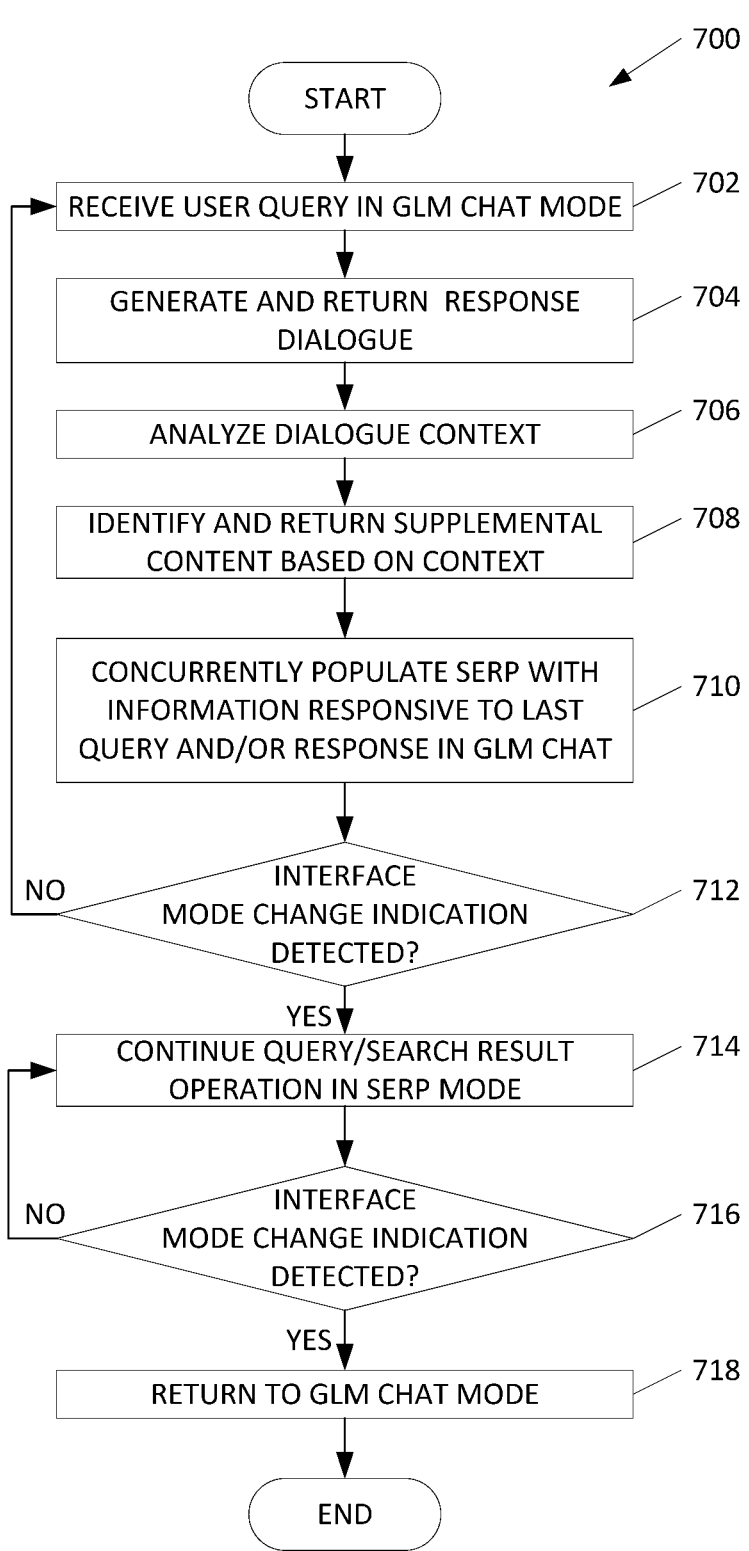
Figure 8:
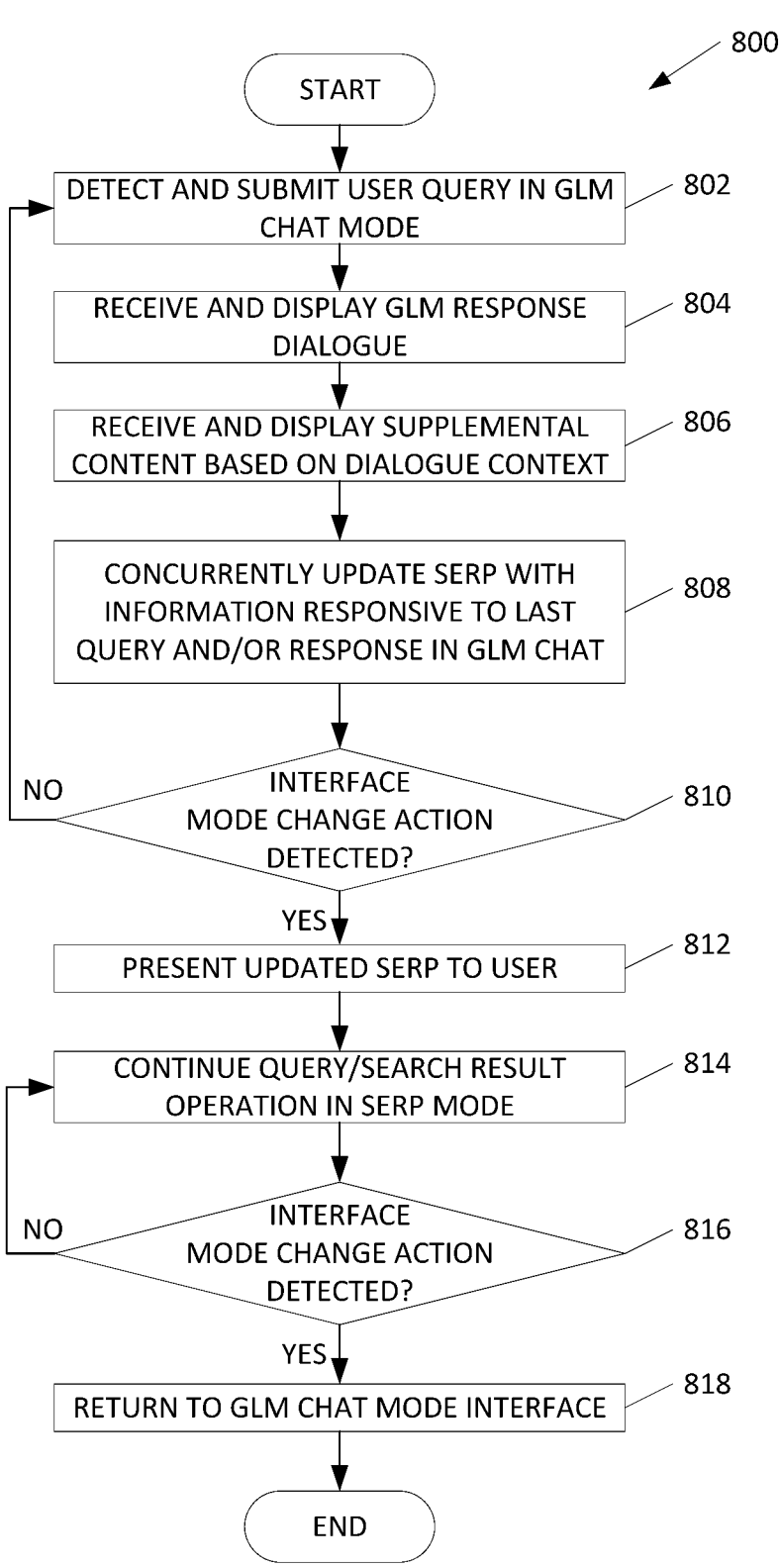
FIG. 8 shows a flow diagram for providing dual mode search functionality on a client device, in accordance with one or more aspects described herein.

FIGS. 7-8 illustrate methodologies relating to providing a dual mode search functionality that permits a user to switch seamlessly between a generative language model conversation or chat mode and a search engine results page mode, in accordance with one or more embodiments described herein. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 7, a flow diagram depicting a method 700 for providing dual mode search functionality in a computing system is depicted, in accordance with one or more aspects described herein. At 702, the user query is received in GLM chat mode. At 704, a GLM response dialog is generated and returned, e.g., by the generative language model (see FIG. 1). At 706, dialog context is analyzed. At 708, supplemental content is identified based on the context of the dialog and is returned to the user device for display to the user. While the GLM chat dialog is ongoing at 702-708, a SERP is concurrently populated with information responsive to the last query and or response in the GLM chat, at 710. At 712, a determination is made regarding whether an interface mode change indication has been detected. The interface mode change indication may be triggered, for example, by a user swiping, scrolling, selecting a mode change graphical icon, entering a voice command to change modes, etc. If the determination at 712 indicates that no interface mode change indication has been detected, then the method reverts to 702 for continued GLM chat mode operation and receipt of a subsequent query.

If it is determined at 712 that an interface mode change indication has been detected, then the method proceeds to 714, where query and search result operation is continued in SERP mode. The user's device at this point can present the SERP populated with information responsive to the last GLM chat query and/or response. At 716, a determination is made whether an interface mode change indication has been detected. If not, then the method reverts to 714 for continued operation in SERP mode. If the determination at 716 indicates that a mode change indication has been detected, then the method proceeds to 718, where system operation returns to GLM chat mode.

Turning now to FIG. 8, a flow diagram depicting a method 800 for providing dual mode search functionality on a client device is depicted, in accordance with one or more aspects described herein. At 802, a user query in GLM chat mode is detected and transmitted by the client device to a computing system via, e.g., a network. At 804, a GLM response dialog is received from e.g., a generative language model on the computing system, and is displayed on the client device. At 806, supplemental content that is based on dialog context is received and displayed at the client device. At 808, concurrently with the GLM chat dialog occurring at 802-806, a SERP is updated with information related to the last query and/or response in the GLM chat dialog. At 810, a determination is made regarding whether an interface mode change action has been detected on the client device. The interface mode change action may be, for example, a user swiping, scrolling, selecting a mode change graphical icon, entering a voice command to change modes, etc. If the determination at 810 indicates that no interface mode change action has been detected, then the method reverts to 802 for continued GLM chat mode operation and receipt of a subsequent query.

If it is determined at 810 that an interface mode change indication has been detected, and the method proceeds to 812, and the updated SERP is presented to the user on the client device. At 814, query and search result operation is continued in SERP mode. At 816, a determination is made whether an interface mode change action has been detected. If not, then the method reverts to 814 for continued operation in SERP mode. If the determination at 816 indicates that an interface mode change action has been detected, then the method proceeds to 818, where client device operation and display returns to GLM chat mode.

With continued reference to FIGS. 1-8, various additional contemplated features and aspects are described below. In one embodiment, conversation mode can be entered from any search endpoint, including but not limited to web search, multimedia search, shopping portals, videos, maps, news, work, etc. For instance, a user can click on a "chip" or graphical icon on a display screen when in SERP mode to enter GLM conversation mode, and while in conversation mode be presented with another graphical icon that can be selected to re-enter SERP mode. When using a touch screen computer or mobile device, the user can swipe up or down or left or right to switch between SERP mode and conversation mode, depending on the designated orientation of the mode interfaces. In a related embodiment, the swipe direction for changing between SERP and GLM conversation modes is configurable by the user.

In another embodiment, a selectable graphical icon may be presented in a sidebar on the displayed page, a sidebar or other panel in a web browser, and/or elements displayed on the page may be wrapped with conversation. The system can also be configured to ask the user questions as part of the conversation, such as asking open-ended clarifying questions, in addition to providing suggestion chips or icons with fixed responses.

Other features include voice driven search, visual question answering over visual content, bot-labeled commentary on objects on the page, (icon plus commentary), voice commentary on user interactions with page elements, adaptive generation based on user interactions and attention, dialog driven interactions with content on the SERP page, wrapper or right rail-overlay, interactions with other UIs for other content (email search, search of an enterprise document repository, etc.).

Additional features can include: dialog driven interactions with the dynamically generated web page; dynamic layout rearrangement; dynamic edition of elements into the conversation history; full page transition from dialog elements in conversation; weather element in conversation; the ability to click on an answer card to switch back to full page portal/detailed/non-mini version of the element; the ability to switch between in-conversation elements and full-experience modes; etc. For example, the user can switch from a shopping answer to a full page shopping page. Other features include: answer/exploded views; the ability to put answers in conversation aside; to pin them; to put them in a new browser tabs, etc. Additionally, an "expand" button can be provided for answers that have an alternative expanded mode to switch to.

Further, an option is provided for a multi-page conversation. For example, a given model state can include dialog/interactions across multiple tabs/pages/searches.

Other features include the ability to have content of a full news article shown as an answer added to the dialog context.

For instance, the system can fetch a news article, but show only a headline and an image of the news article. In this scenario, the user can ask a next question that leverages the full content of the news article and/or prioritizes fetching the content to generate the next response.

In another embodiment, search results in conversation mode can be delivered as a web results answer card and/or a semantic summary answer card.

The described systems and methods also provide the ability to share conversation with others, allow multi-party conversations, save conversations for later resumption, bookmark conversations, save full dialog history for later review, timestamp dialog conversation so that a next response can leverage recent conversation history across multiple windows/conversations, share turns of a conversation widely (e.g., on social media), integrate mixed-mode external content/dialog into enterprise chat applications, provide upsells into another application experience, etc.

In another example, the described systems and methods facilitate providing a "new tab page" including one or more of a "what's new" summary, asynchronous updates on what is happening regarding user data, user interests, what is happening in the world, etc. Email can be another experience where a mini-answer/expanded/full-page mode are provided. For email, the sub-answers can be individual emails, info about people, people answers/cards, etc. "Expand" mode can launch a new window or tab for composing/sending an email reply. Answers can include a short list of relevant emails, or SharePoint items. Expand mode can also transition to a full-page Word document for a document result. There also is contemplated an option to switch back to conversation with mini-answer mode.

Figure 9:
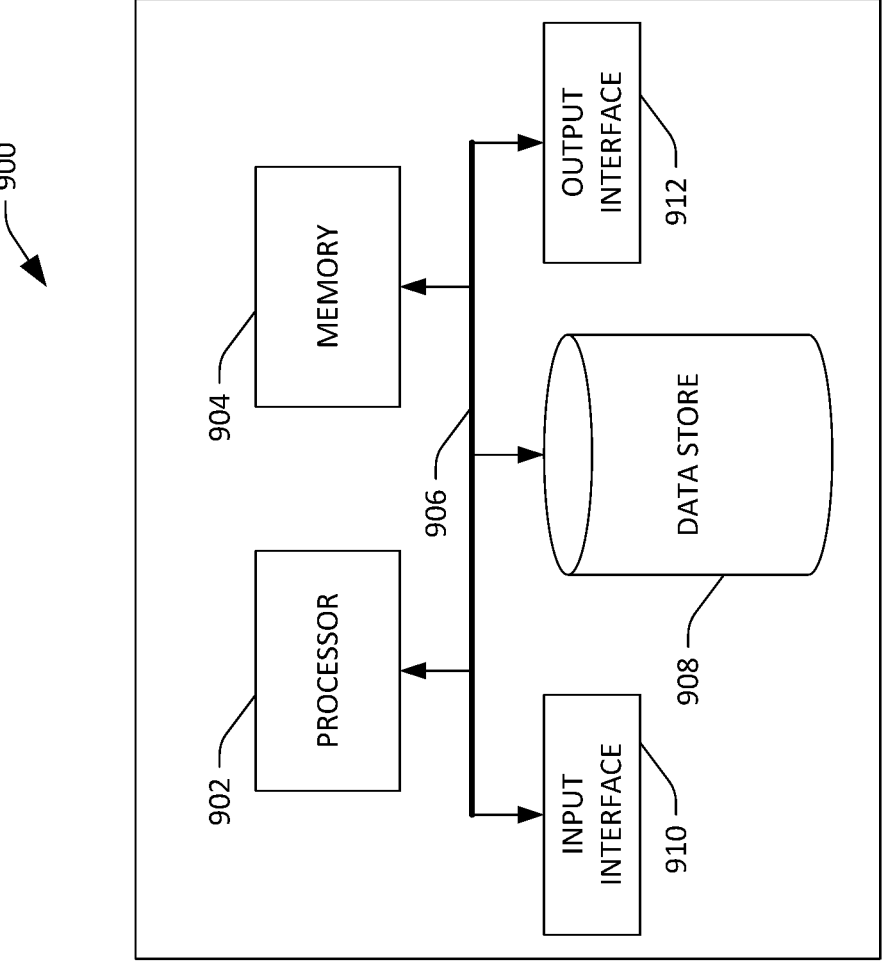
FIG. 9 is a high-level illustration of an exemplary computing device that can be used in accordance with the systems and methodologies disclosed herein.

Referring now to FIG. 9, a high-level illustration of an exemplary computing device 900 that can be used in accordance with the systems and methodologies disclosed herein is illustrated. For instance, the computing device 900 may be a client computing device that has an operating system stored thereon, where the operating system provides a dual mode SERP/GLM search functionality. By way of another example, the computing device 900 can be a server computing system that provides the dual mode SERP/GLM search functionality. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store content, graphical icons, profile information, etc.

The computing device 900 additionally includes a data store 908 that is accessible by the processor 902 by way of the system bus 906. The data store 908 may include executable instructions, graphical icons, profile information, content, etc. The computing device 900 also includes an input interface 910 that allows external devices to communicate with the computing device 900. For instance, the input interface 99 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Described herein are various technologies according to at least the following examples.

(A1) In an aspect, a computing device is described herein. The computing device comprises a processor, and memory storing instructions that, when executed by the processor, cause the processor to perform acts. The acts comprise generating a prompt that is to be input to a generative language model, where the prompt includes conversational input set forth by a user. The acts further comprise providing the prompt as input to the generative language model. The acts also comprise receiving conversational output from the generative language model, where the generative language model generated the conversational output based upon the prompt. Additionally, the acts comprise receiving an indication that the user has performed an interface mode change action. The acts further comprise updating a search engine results page (SERP) to provide information related to the conversational output generated by the generative language model. The acts also comprise presenting the updated SERP to the user on a client computing device.

(A2) In some embodiments of the computing device of (A1), the acts further comprise determining a context of a dialogue comprising the conversational inputs and outputs, and receiving and displaying supplemental content based on the dialogue context.

(A3) In some embodiments of the computing device of at least one of (A1)-(A2), the acts further comprise receiving and displaying one or more selectable query suggestions from the generative language model, the query suggestions having been generated by the generative language model based on the conversational inputs and outputs.

(A4) In some embodiments of the computing device of (A3) the acts further comprise prompting the user to switch to SERP mode upon user selection of one of the one or more selectable query suggestions.

(A5) In some embodiments of the computing device of at least one of (A1)-(A4), the acts further comprise receiving and displaying one or more selectable hyperlinks that correspond to one or more sources of information included in the conversational output, the hyperlinks being usable by a search engine to retrieve the one or more sources of information upon selection.

(A6) In some embodiments of the computing device of at least one of (A1)-(A5), the acts further comprise receiving an indication that the user has performed an additional interface mode change action and resuming display of the conversational inputs and outputs.

(A7) In some embodiments of the computing device of at least one of (A1)-(A6), the interface mode change action comprises at least one of a swipe, selection of a selectable graphical icon, a voice command, and manipulation of a slider bar, on a graphical user interface to toggle between a SERP mode and a conversation mode.

(B1) In another aspect, a computing system is described herein. The computing system comprises a processor, and memory storing instructions that, when executed by the processor, cause the processor to perform acts. The acts comprise receiving a prompt as input to a generative language model, where the prompt includes conversational input set forth by a user. The acts further comprise generating and displaying conversational output from the generative language model, where the conversational output is generated based upon the prompt. The acts also comprise receiving an indication that the user has performed an interface mode change action. The acts further comprise updating a search engine results page (SERP) to provide information related to the conversational output generated by the generative language model. Additionally, the acts comprise providing the updated SERP to the user on a client computing device.

(B2) In some embodiments of the computing system of (B1), the acts further comprise determining a context of a dialogue comprising the conversational inputs and outputs, and retrieving and displaying supplemental content based on the dialogue context.

(B3) In some embodiments of the computing system of at least one of (B1)-(B2), the acts further comprise generating and displaying one or more selectable query suggestions by the generative language model, the selectable query suggestions being based on the conversational inputs and outputs.

(B4) In some embodiments of the computing system of (B3), the acts further comprise prompting the user to switch to SERP mode upon user selection of one of the one or more selectable query suggestions.

(B5) In some embodiments of the computing system of at least one of (B1)-(B4), the acts further comprise generating and displaying one or more selectable hyperlinks that correspond to one or more sources of information included in the conversational output, the selectable hyperlinks being usable by a search engine to retrieve the one or more sources of information upon selection.

(B6) In some embodiments of the computing system of at least one of (B1)-(B5), the acts further comprise receiving an indication that the user has performed an additional interface mode change action and resuming display of the conversational inputs and outputs.

(B7) In some embodiments of the computing system of at least one of (B1)-(B6), the interface mode change action comprises at least one of a swipe, selection of a selectable graphical icon, a voice command, and manipulation of a slider bar, on a graphical user interface to toggle between a SERP mode and a conversation mode.

(C1) In another aspect, a method performed by a computing system is described herein. The method comprises receiving a prompt as input to a generative language model, where the prompt includes conversational input set forth by a user. The method further comprises generating and displaying conversational output from the generative language model, where the conversational output is generated based upon the prompt. The method also comprises receiving an indication that the user has performed an interface mode change action. Moreover, the method comprises updating a search engine results page (SERP) to provide information related to the conversational output generated by the generative language model. The method also comprises providing the updated SERP to the user on a client computing device.

(C2) In some embodiments of the method of (C1), the method further comprises determining a context of a dialogue comprising the conversational inputs and outputs. The method also comprises retrieving and displaying supplemental content based on the dialogue context. Additionally, the method comprises generating and presenting one or more selectable query suggestions by the generative language model, the selectable query suggestions being based on the conversational inputs and outputs.

(C3) In some embodiments of the method of at least one of (C1)-(C2), the method further comprises prompting the user to switch to SERP mode upon user selection of one of the one or more selectable query suggestions.

(C4) In some embodiments of the method of at least one of (C1)-(C3), the method further comprises generating and displaying one or more selectable hyperlinks that correspond to one or more sources of information included in the conversational output, the selectable hyperlinks being usable by a search engine to retrieve the one or more sources of information upon selection.

(C5) In some embodiments of the method of at least one of (C1)-(C4), the method further comprises receiving an indication that the user has performed an additional interface mode change action and resuming display of the conversational inputs and outputs.

(C6) In some embodiments of the method of at least one of (C1)-(C5), the interface mode change action comprises at least one of a swipe, selection of a selectable graphical icon, a voice command, and manipulation of a slider bar, on a graphical user interface to toggle between a SERP mode and a conversation mode.

(D1) In another aspect, a method performed by a computing device is described herein, wherein the method comprises any of the acts set forth in embodiments (A1)-(A7).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device comprising:
   a processor; and
   memory storing instructions that, when executed by the processor, cause the processor to perform acts comprising:
   obtaining conversational input set forth by a user of a client computing device;
   generating a prompt comprising at least a portion of the conversational input set forth by the user;
   providing the prompt as input to a generative language model, wherein the generative model generates an output based upon the prompt, wherein the output comprises conversational output;
   receiving an indication that the user has performed an interface mode change action;
   updating a search engine results page (SERP) based upon at least the conversational output generated by the generative language model; and
   presenting the updated SERP to the user at the client computing device.

2. The computing device according to claim 1, wherein the acts further comprise determining a context of a dialogue comprising the conversational input and the conversational output, and receiving and displaying supplemental content based on the dialogue context.

3. The computing device according to claim 1, the acts further comprising receiving and displaying one or more selectable query suggestions from the generative language model, wherein the one or more selectable query suggestions are generated by the generative language model based on the conversational input and the conversational output.

4. The computing device according to claim 3, the acts further comprising prompting the user to switch to SERP mode upon user selection of one of the one or more selectable query suggestions.

5. The computing device according to claim 1, the acts further comprising receiving and displaying one or more selectable hyperlinks that correspond to one or more sources of information included in the conversational output, wherein the one or more selectable hyperlinks are usable by a search engine to retrieve the one or more sources of information upon selection.

6. The computing device according to claim 1, the acts further comprising receiving an indication that the user has performed an additional interface mode change action and resuming display of the conversational input and the conversational output.

7. The computing device according to claim 1, wherein the interface mode change action comprises at least one of a swipe, selection of a selectable graphical icon, a voice command, and manipulation of a slider bar, on a graphical user interface to toggle between a SERP mode and a conversation mode.

8. A computing system comprising:

a processor; and memory storing instructions that, when executed by the processor, cause the processor to perform acts comprising:

obtaining conversational input set forth by a user of a client computing device;

generating a prompt comprising at least a portion of the conversational input set forth by the user;

providing the prompt as input to a generative language model, wherein the generative model generates an output based upon the prompt, wherein the output comprises conversational output;

receiving an indication that the user has performed an interface mode change action;

updating a search engine results page (SERP) based upon at least the conversational output generated by the generative language model; and providing the updated SERP to the user on the client computing device.

9. The computing system according to claim 8, wherein the acts further comprise determining a context of a dialogue comprising the conversational input and the conversational output, and retrieving and displaying supplemental content based on the dialogue context.

10. The computing system according to claim 8, the acts further comprising:

generating, by the generative language model, one or more selectable query suggestions, wherein the one or more selectable query suggestions are based upon the conversational input and the conversational output; and causing display of the one or more selectable query suggestions concurrently with the presenting of the updated SERP.

11. The computing system according to claim 10, the acts further comprising prompting the user to switch to SERP mode upon user selection of one of the one or more selectable query suggestions.

12. The computing system according to claim 8, the acts further comprising generating and displaying one or more selectable hyperlinks that correspond to one or more sources of information included in the conversational output, wherein the one or more selectable hyperlinks are usable by a search engine to retrieve the one or more sources of information upon selection.

13. The computing system according to claim 8, the acts further comprising receiving an indication that the user has performed an additional interface mode change action and resuming display of the conversational input and the conversational output.

14. The computing system according to claim 8, wherein the interface mode change action comprises at least one of a swipe, selection of a selectable graphical icon, a voice command, and manipulation of a slider bar, on a graphical user interface to toggle between a SERP mode and a conversation mode.

15. A method that facilitates providing a dual-mode search interface on a computing device, the method comprising:

obtaining conversational input set forth by a user of a client computing device;

generating a prompt comprising at least a portion of the conversational input set forth by the user;

providing the prompt as input to a generative language model, wherein the generative model generates an output based upon the prompt, wherein the output comprises conversational output;

receiving an indication that the user has performed an interface mode change action;

updating a search engine results page (SERP) based upon at least the conversational output generated by the generative language model; and providing the updated SERP to the user on the client computing device.

16. The method according to claim 15, further comprising:

determining a context of a dialogue comprising the conversational input and the conversational output;

retrieving supplemental content based on the dialogue context;

causing the supplemental content to be displayed at the client computing device;

generating, by the generative language model, one or more selectable query suggestions, wherein the one or more selectable query suggestions are based on the conversational input and the conversational output; and causing the one or more selectable query suggestions to be displayed concurrently with presenting the updated SERP.

17. The method according to claim 16, further comprising prompting the user to switch to SERP mode upon user selection of one of the one or more selectable query suggestions.

18. The method according to claim 15, further comprising generating one or more selectable hyperlinks that correspond to one or more sources of information included in the conversational output, wherein the one or more selectable hyperlinks are usable by a search engine to retrieve the one or more sources of information upon selection.

19. The method according to claim 15, further comprising receiving an indication that the user has performed an additional interface mode change action and resuming display of the conversational input and the conversational output.

20. The method according to claim 15, wherein the interface mode change action comprises at least one of a swipe, selection of a selectable graphical icon, a voice command, and manipulation of a slider bar, on a graphical user interface to toggle between a SERP mode and a conversation mode.

* * * * *